Patented Feb. 18, 1930

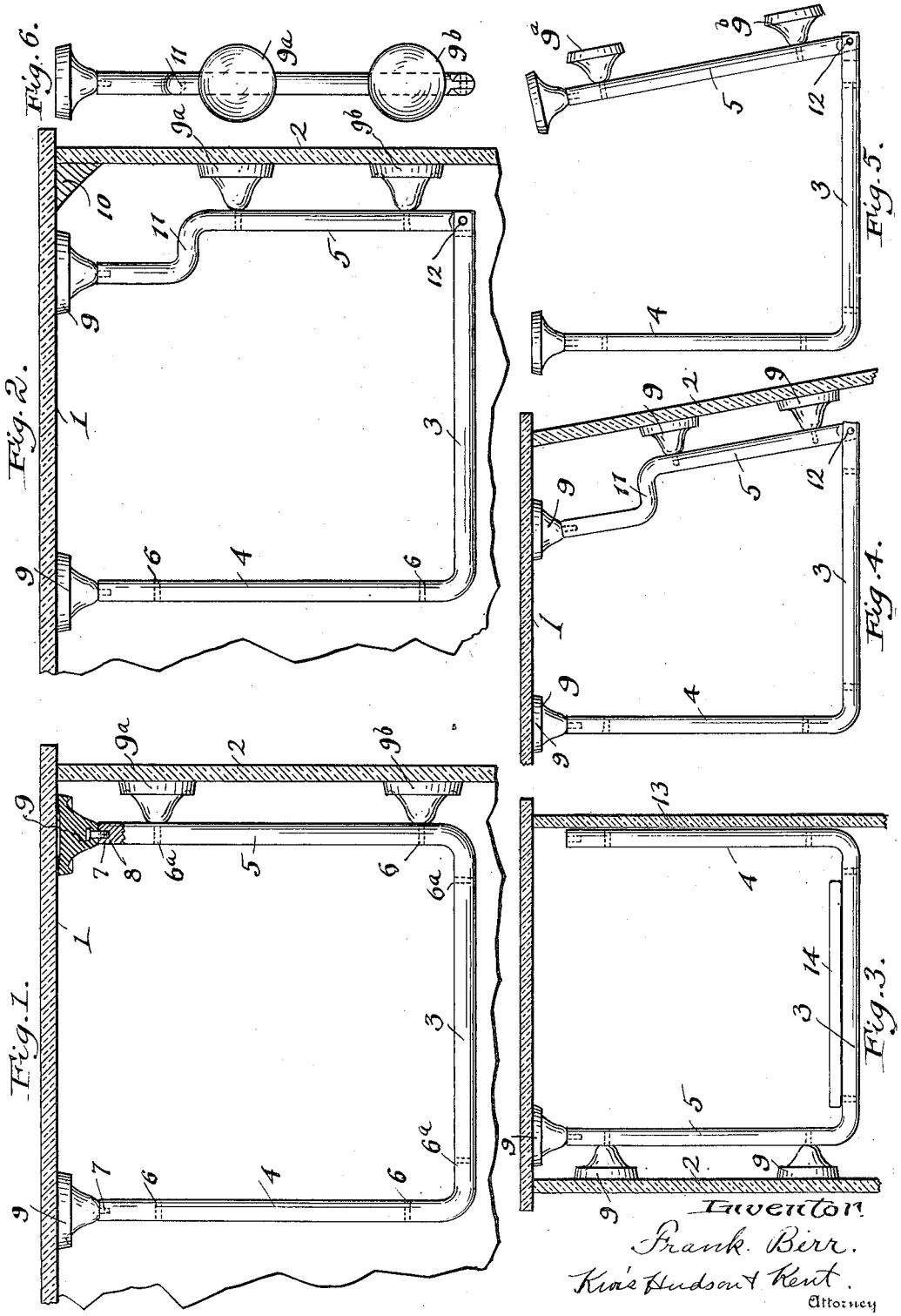

1,747,462

UNITED STATES PATENT OFFICE

FRANK BERR, OF CLEVELAND, OHIO

BRACKET

Application filed June 18, 1926. Serial No. 116,782.

This invention relates to a device for supporting display shelves and the like and particularly to that type of device which is adapted to be supported upon a show case or window-pane or other smooth surface by means of vacuum cups.

The invention is more particularly directed to the feature of construction wherein this supporting bracket is not only supported upon the vertical glass of the show case but is additionally supported upon a horizontal surface which is at substantially right angles thereto.

Another object of the invention is to provide a means whereby these vacuum cups may be attached at different points upon the supporting bracket so that it may be positioned at various angles according to the position of the members to which it is to be attached.

The devices of this character which are at present used for supporting display trays and the like are provided with a pair of vacuum cups which are adapted to be secured to the front glass of the show case, or these devices may be secured to a horizontal glass panel or other smooth surface. The objection to the present devices is, however, due to the fact that as the supporting device is secured merely in one plane, any pressure or weight applied to the outer extremity of the device causes one of the vacuum cups to become dislodged or disengaged from the smooth glass surface, resulting in upsetting the contents of the tray resting upon the supporting device. It is the object of this invention to avoid this objection in display devices of this type and to provide means whereby the supporting bracket is not only supported in a single plane but in planes at substantially right angles to one another so that a load or weight applied to the supporting device at any point will be supported through a plurality of these vacuum cups in different planes.

With the above objects indicated and other objects hereinafter explained in view, my invention consists in the construction and combination of elements hereinafter described and claimed.

Referring to the drawings:

Fig. 1 is an elevational view of a preferred form of my device showing the manner in which the vacuum cups engage the various surfaces.

Fig. 2 is a view similar to Fig. 1 but showing a modified form of the device where the smooth surfaces to which the device is attached are joined together by means of a molding.

Fig. 3 is a further modification of the device positioned in such a manner that one vacuum cup must be omitted.

Fig. 4 is a view similar to Fig. 2 except that the front glass panel is declined at a slight angle with respect to the vertical position and also showing the offset.

Fig. 5 is a similar view to Fig. 4 with the offset removed.

Fig. 6 is an end view of Fig. 2 with the front glass panel removed.

In the drawings, 1 represents a horizontal member of a show case such as glass or other smooth surface and 2 indicates a vertical member of substantially similar nature. A U-shaped bracket is provided and has a horizontal portion 3 and upwardly extending leg portions 4 and 5 and these portions are each provided with a plurality of screw threaded openings 6 positioned at various points. Similar screw threaded openings 7 are provided in the ends of the leg portions 4 and 5 and are adapted to receive a screw threaded extension 8 embedded within a rubber vacuum cup 9. These rubber vacuum cups are provided in each end of the leg portions 4 and 5 as shown in Fig. 1 and similar vacuum cups $9^a$ and $9^b$ are provided to engage with the screw threaded openings $6^a$ in the leg portion 5.

It should be seen from the foregoing description that in order to secure the U-shaped bracket to the supporting structure or show case, the vacuum cups $9^a$ and $9^b$ secured to the upstanding leg portion 5 are pressed against the glass or other smooth surface 2 and the vacuum cups 9 secured in the ends of the upstanding leg portions 4 and 5 are pressed into engagement with the horizontal member 1. This arrangement affords a support for the display tray 14 which rests upon the horizontal portion 3 of the U-shaped bracket and this tray is not only supported by means of the vacuum cups 9ª and 9ᵇ which engage with the vertical smooth surface 2 but is further supported through the engagement of the vacuum cups 9 with the horizontal member 1. In the ordinary use of these vacuum cups as applied to supporting brackets and the like where the bracket is supported by means of the vacuum cups 9ª and 9ᵇ upon the vertical smooth surface 2 the load introduced upon the member 3 causes a downward thrust and has a tendency to dislodge or disengage the upper vacuum cup 9ª which is in engagement with the vertical member 2 and usually causes the contents of the display tray 14 to be spilled.

By constructing a device as shown in Fig. 1 wherein there is provided vacuum cups 9 adapted to engage a horizontal member 1 and vacuum cups 9ª and 9ᵇ to engage a vertical member 2 it will be noted that any weight or load applied to the horizontal member 3 of the bracket will have no effect upon the upper vacuum cup 9ª which engages the vertical member 2 but the load will be carried directly by the vacuum cups 9 engaging the horizontal member 1 and thereby eliminate the possibility of upsetting the bracket and spilling the contents of the display tray or rack.

It is sometimes found in show case construction that a molding 10 is provided at the point where the vertical glass member 2 or other smooth member and the horizontal member 1 joins each other in order to form a reenforced joint. When this condition exists I provide an offset 11 in the upwardly extending leg portion 5 of substantial depth and then continue the leg upwardly in the same manner as heretofore described. The vacuum cups 9 are attached to the leg portions 4 and 5 in substantially the same manner, that is, screw threaded into the ends of the legs but the vacuum cup 9ª secured to the upper portion of the leg 5 is secured in a position below the offset 11. The application of the bracket is the same as described with respect to Fig. 1 except that it is designed to avoid interference such as reenforcing member or molding 10.

It very frequently happens that the vertical member 2 of the show case is not at right angles with the horizontal member 1 but extends at a substantial angle as indicated at Fig. 4. When this condition exists the upwardly extending leg 5 may be pivoted, as at 12, at its lower end to the horizontal portion 3 of the bracket and this permits the device to be secured to a suface which is inclined at any substantial angle with respect to the horizontal member 1.

Fig. 5 shows a construction similar to that disclosed in Fig. 4 except that the upwardly extending leg 5 is provided without the offset 11, it being unnecessary to provide this offset except in cases where it is found that the molding 10 is used as a reenforcing member for the horizontal surface 1 and the vertical surface 2 of the show case.

In Fig. 3 there is disclosed a construction which is substantially identical with the construction disclosed in Fig. 1 except it should be noted that an additional vertical partition 13 is provided and because of this condition it is necessary to eliminate the vacuum cup 9 which is usually provided in the end of the leg portion 4. A tray 14 is also shown in its position with respect to the horizontal leg 3 of the bracket. It will be seen from Fig. 3 that if the space between the vertical glass 2 and the partition 13 is small enough the upstanding leg 4 will rest against the partition 13 and acts as a reenforcing means so that it will not be necessary to use the vacuum cup 9 which is ordinarily provided in the end of this upstanding leg portion 4. However, if the partition 13 is somewhat separated from the upstanding leg 4 but still close enough so as to prevent the use of the vacuum cup 9 in the end of the upstanding leg 4 an offset 11 may be employed as is indicated in Fig. 2.

As the vacuum cups 9, 9ª and 9ᵇ are provided with screw threaded extensions 8 and as there is provided a plurality of screw threaded openings 6 at different points on the portion 3 and the leg portions 4 and 5 it will be seen that a number of different arrangements can be employed and that the bracket may be used where the construction of the supporting members are considerably different, but in each instance the arrangement should be such that the respective groups of vacuum cups are at substantially right angles to each other.

Having thus described my invention, I claim:

1. A bracket of the type described comprising a supporting member provided with a pair of spaced legs, one of said legs being pivoted at one end, vacuum cups secured to the end portions of the spaced legs and similar vacuum cups secured to the pivoted leg.

2. A bracket of the type described comprising a supporting member provided with a pair of leg portions, one of said leg portions having an offset formed therein, vacuum cups secured to the end portions of the leg portions and similar vacuum cups secured to the leg which has the offset.

3. A bracket of the type described comprising a supporting member provided with a pair of substantially parallel leg portions, and a connecting portion therebetween, a vacuum cup secured to one of the leg portions and similar vacuum cups secured to the outer side of one of the other two portions.

4. A bracket of the type described comprising a shelf supporting member provided with a pair of upstanding leg portions, securing means for the end portions of said upstanding leg portions, securing means for the side of one of the legs of said supporting member, and vacuum cups respectively secured to said supporting member by said securing means.

5. In a device of the character described the combination of a tray supporting member provided with substantially parallel leg portions, vacuum cups secured to the ends of said leg portions and adapted to engage with the horizontal portion of a show case or the like and vacuum cups secured to one leg portion extending outwardly therefrom and adapted to engage with a vertical portion of a show case.

6. In combination a pair of supporting members spaced apart and adapted to support spaced portions of an element extending therebetween, said supporting members being provided with spaced leg portions, vacuum cups secured to the outer portions of said members and having their attaching faces adapted to engage with a horizontal portion of a show case, vacuum cups secured to one upstanding leg portion of each supporting member and having attached faces in parallel with said leg portions but at right angles to said first mentioned cups and adapted to engage with the vertical portion of a show case.

7. A supporting bracket adapted to be mounted within the interior angle between the top wall and side wall of a structure, comprising a supporting member having a portion substantially parallel to the top wall and adapted to receive a horizontally disposed shelf, and vacuum cups secured to and extending outwardly therefrom, one of said cups being adapted to engage the top wall while another of said cups is adapted to engage the side wall.

8. A bracket of the type described, comprising a shelf supporting member of substantially U-shape, a vacuum cup secured to one of the legs of said U-shaped member with its attaching face substantially parallel to said leg, and a vacuum cup secured to another portion of said member and having its attaching face substantially at right angles to the first mentioned vacuum cup.

In testimony whereof, I hereunto affix my signature.

FRANK BERR.